(12) United States Patent (10) Patent No.: US 7,878,229 B2
Nakajima et al. (45) Date of Patent: Feb. 1, 2011

(54) HOLLOW STRUCTURE PLATE, MANUFACTURING METHOD THEREOF, MANUFACTURING DEVICE THEREOF, AND SOUND ABSORBING STRUCTURE PLATE

(75) Inventors: Masahiko Nakajima, Gifu (JP); Takeshi Miyazaki, Gifu (JP); Takayuki Oda, Gifu (JP); Kenji Kozuka, Gifu (JP)

(73) Assignee: UBE Nitto Kasei Co., Ltd., Tokyo (JP)

( * ) Notice: Subject to any disclaimer, the term of this patent is extended or adjusted under 35 U.S.C. 154(b) by 405 days.

(21) Appl. No.: 12/003,754

(22) Filed: Dec. 31, 2007

(65) Prior Publication Data

US 2008/0128080 A1 Jun. 5, 2008

Related U.S. Application Data

(62) Division of application No. 10/509,225, filed as application No. PCT/JP03/03742 on Mar. 26, 2003.

(30) Foreign Application Priority Data

Mar. 26, 2002 (JP) ............................ 2002-086448
Feb. 14, 2003 (JP) ............................ 2003-037009

(51) Int. Cl.
*B32B 37/10* (2006.01)
(52) U.S. Cl. .................. 156/382; 156/347; 156/209; 156/292; 156/309.9; 156/543; 493/418; 493/450; 493/463
(58) Field of Classification Search ............... 156/347, 156/382, 209, 292, 309.9, 543, 473, 471; 493/418, 450, 463
See application file for complete search history.

(56) References Cited

U.S. PATENT DOCUMENTS 2,429,482 A 10/1947 Munters (Continued)

FOREIGN PATENT DOCUMENTS

CN 2445021 8/2001

(Continued)

OTHER PUBLICATIONS

Chinese Office Action (with English translation) issued Dec. 5, 2008 in Chinese Application No. 200610079885.4.

(Continued)

*Primary Examiner*—Khanh Nguyen
*Assistant Examiner*—Margaret Squalls
(74) *Attorney, Agent, or Firm*—Wenderoth, Lind & Ponack, L.L.P.

(57) ABSTRACT

Introduction guides 12 are provided above and below a sheet-introduction opening portion of a pressure-reduced chamber 10, and heating means 17 is provided between the introduction guides. Each resin sheet 3 is attracted and attached respectively to the circumferential surface of a corresponding emboss roller 11 by reducing pressure. Pins 112 of the emboss roller 11 are truncated cone-shaped. The ratio of the total area of the lower bases of the pins 112 to the area of the circumferential surface of the emboss roller is 0.5 or more. The rising angle θ of the pin side face, in the vertical plane including the central axis of the pins 112, is in the range from 50 degrees to 70 degrees. Furthermore, a multilayered hollow structure plate 140 is formed by attaching non-air-permeable sheets 130 onto both the front and back of a core member obtained by fusing together hollow protrusions 112 in two thermoplastic resin sheets. A sound absorbing material 150 is provided on at least one of the front and back side thereof, and small holes 114a opened in the multilayered hollow structure plate are formed in liner portions 114 and the non-air permeable sheet 130 only in the positions that matches the liner portions 114.

4 Claims, 9 Drawing Sheets

U.S. PATENT DOCUMENTS

| | | | |
|---|---|---|---|
| 2,513,541 | A | 7/1950 | Winegar et al. |
| 2,660,757 | A | 12/1953 | Smith et al. |
| 2,905,969 | A | 9/1959 | Gilbert et al. |
| 3,294,387 | A | 12/1966 | Chavannes |
| 3,748,213 | A | 7/1973 | Kitching et al. |
| 4,167,598 | A | 9/1979 | Logan et al. |
| 4,181,548 | A | 1/1980 | Weingarten |
| 4,284,396 | A | 8/1981 | Thissen et al. |
| 4,381,212 | A * | 4/1983 | Roberts ............ 156/473 |
| 4,643,706 | A * | 2/1987 | Pohl et al. ............ 493/463 |
| 5,057,176 | A | 10/1991 | Bainbridge |
| 6,004,652 | A | 12/1999 | Clark |
| 6,029,962 | A | 2/2000 | Shorten et al. |
| 6,385,864 | B1 | 5/2002 | Sell et al. |

FOREIGN PATENT DOCUMENTS

| | | |
|---|---|---|
| DE | 20 35 449 | 1/1972 |
| JP | 03-061524 | 3/1991 |
| JP | 3-61524 | 3/1991 |
| JP | 07-054420 | 2/1995 |
| JP | 8-127091 | 5/1996 |
| JP | 3069476 | 3/2000 |
| JP | 2000-326430 | 11/2000 |

OTHER PUBLICATIONS

Office Action issued Nov. 13, 2008 in U.S. Appl. No. 10/509,225.

European Search Report issued Dec. 19, 2008 in European Application No. EP 03 71 5433.

Office Action issued Feb. 16, 2010 in corresponding Japanese Application No. 2008-201678 (with English translation).

Office Action issued Mar. 17, 2009 in U.S. Appl. No. 12/003,753.

Chinese Office Action (with English translation) issued Apr. 3, 2009 in counterpart Chinese Application No. 200610079886.9.

Chinese Office Action (with English translation) issued Apr. 18, 2008 in Chinese Application No. 200610079885.4.

Chinese Office Action (with English translation) issued Apr. 11, 2008 in Chinese Application No. 200610079886.9.

U.S. Office Action issued Apr. 8, 2008 in U.S. Appl. No. 10/509,225.

Examination Report issued May 27, 2009 in counterpart European Application No. 03 715 433.

Japanese Office Action (with English translation) issued Jun. 10, 2008 in Japanese Application No. 2003-578131.

Office Action issued Jul. 22, 2009 in U.S. Appl. No. 10/509,225.

Office Action issued Aug. 7, 2008 in U.S. Appl. No. 12/003,753.

Japanese Office Action (with English translation) issued Aug. 26, 2008 in counterpart Japanese Application No. 2003-578131.

Chinese Office Action (with English translation) issued Sep. 26, 2008 in counterpart Chinese Application No. 200610079886.9.

Office Action issued Apr. 27, 2010 in counterpart Japanese Application No. 2008-201678 (with English translation).

* cited by examiner

(Cross-section taken along A-A)

FIG. 9

(Cross-section taken along B-B)

FIG. 10

(Portion C enlarged)

HOLLOW STRUCTURE PLATE, MANUFACTURING METHOD THEREOF, MANUFACTURING DEVICE THEREOF, AND SOUND ABSORBING STRUCTURE PLATE

CROSS-REFERENCES TO RELATED APPLICATIONS

This application is a divisional of U.S. patent application Ser. No. 10/509,225, which is the National Stage of International Application No. PCT/JP03/03742, filed Mar. 26, 2003.

TECHNICAL FIELD

The present invention relates to hollow structure plates, methods and apparatuses for manufacturing the same, and sound absorbing structure plates.

BACKGROUND ART

Plastic hollow structure plates, such as flute-shaped plastic cardboards (product name: Danplate manufactured by Ube-Nitto Kasei Co., Ltd.), corrugated plastic cardboards, plastic structure plates in which columnar independent air compartments are formed (product name: Plapearl manufactured by Kawakami Sangyo Co., Ltd.), are lightweight and have excellent water resistance, heat resistance, chemical resistance and other properties, and thus have conventionally been used in various applications such as building panels, containers, various boxes, and interior materials for, for example, houses, buildings, offices, and vehicles (e.g., see JP 2000-326430A as a honeycomb structure plate).

Among these, hollow structure plates in which columnar independent air compartments (hereinafter, referred to as "hollow protrusions") are formed are known to have no difference in strength between the vertical and the horizontal directions, compared with corrugated plastic cardboards or flute-shaped plastic cardboards.

Such a structure plate can be obtained by molding a thermoplastic resin sheet under a reduced pressure. In this structure, when it is attempted to increase the height of a hollow protrusion to increase the thickness, the wall portion constituting the hollow protrusion turns into a film, so that the strength cannot be maintained. If the thickness of the resin sheet is increased in order to solve this problem, then the weight is inevitably increased and the property of being lightweight is impaired. Therefore, a technique disclosed in JP 2000-326430A has been developed as a conventional art of the present invention.

In this technique, a plurality of hollow protrusions are projected in each of a pair of resin sheets, and the resin sheets are fused with the hollow protrusions facing each other, so that a hollow structure plate is obtained. By attaching the two sheets, the thickness can be made twice larger than the conventional thickness while the strength is maintained. Subsequently after the formation of the hollow protrusions and the attachment process, a smoothly planed board or the like is laminated on the opposite surfaces of the two resin sheets, and thus a plate material product having a lightweight hollow structure can be obtained.

A method for manufacturing this structure, which is disclosed in the above-mentioned publication, is as follows. Two resin sheets extruded from a T-die are supplied between a pair of emboss rollers in which a multitude of pins are projected from their outer circumferential portions, and the pressure inside the rollers is reduced and evacuated, so that the two resin sheets are molded so as to be pin-shaped under a reduced pressure. At the same time, the pins are brought in contact with each other with the rotation of the rollers so that the end faces of the hollow protrusions are thermally fused to become integral. In this state, the sheets are taken up by a take-up roller, and thus an integral hollow structure plate can be obtained.

However, the above-described manufacturing method has the following technical problems in terms of the shape or the properties, and cannot be adapted for manufacturing in practice.

First, often, the sheet cannot be attached onto the roller simply by evacuating the roller, and evacuation loss occurs, so that when forming hollow protrusions having a large height, molding is impossible.

Second, when the rollers are heated to a temperature at which the hollow protrusions of the resin sheets can be molded, the resin sheets get attached to the rollers, which makes mold release difficult. Even if mold-release is performed successfully, the shape is transformed because the temperature of the hollow protrusions is at least a melting point or more. On the other hand, if the molding temperature is too low, then the bottom surfaces of the hollow protrusions cannot be fused and joined together, even if they are in contact with each other. In such a case, the resin sheets are detached from each other at the joined portion when a bending load is applied to the obtained hollow structure plate, and thus the rigidity is decreased. Therefore, strict control of the temperature becomes necessary in order to obtain high quality hollow structure plates.

Furthermore, when the difference in the size (diameter ratio) between the upper base and the lower base of each pin is small, not only does the mold-release property deteriorate, but also the following problem occurs: in the molded hollow structure plate, the amount of resin for the hollow protrusions is increased and the balance with the liner portion in which no hollow protrusion is formed collapses, so that webbing occurs and thus the formativeness deteriorates.

Furthermore, the bending elasticity gradient of the hollow structure plate is improved as the interval between the pins is smaller, but simply reducing the interval between the pins causes webbing in the hollow structure plate more easily, especially when the difference in the size between the upper base and the lower base of the pin is small.

Furthermore, such a hollow structure plate has a poor sound absorbency, and it is necessary to attach a porous sheet-shaped member such as an urethane foam sheet, a non-woven fabric, and a woven fabric in order to improve the sound absorbency. Furthermore, in a commonly used sound absorbing material, the sound absorbency depends greatly on the thickness thereof, so that for example, as the thickness of the porous sheet-shaped member becomes smaller, the sound absorbency, especially in the low or medium frequency region, becomes poorer. Moreover, rock wool, plaster boards and the like that are used as interior materials for houses such as ceiling materials or wall materials are lightweight and have excellent sound absorbency and thermal insulation performance, but the rigidity and water resistance are poor.

The present invention solves the above-described technical problems, and an object thereof is to provide a method and an apparatus for manufacturing a hollow structure plate that allow hollow protrusion processing and melt joining of two thermoplastic resin sheets that have been extrusion-molded to be performed reliably in a short time, and that facilitate the temperature control.

Furthermore, the present invention solves the above-described technical problems, and an object thereof is to provide a technique that allows hollow protrusion processing and melt joining of two thermoplastic resin sheets that have been extrusion-molded to be performed reliably in a short time and facilitates the temperature control, and that also enables manufacturing of a hollow structure plate having good flexural properties.

Furthermore, the present invention has an object of providing a lightweight hollow structure plate having excellent strength, rigidity, heat resistance, and water resistance and high sound absorbency with an appropriate thickness without attaching a porous sheet-shaped member such as an urethane foam, a non-woven fabric, and a woven fabric. Furthermore, the present invention has an object of providing a hollow structure plate having high sound absorbency throughout the audible range by combining the above-described hollow structure plate and another sound absorbing material, without canceling out the effect of one another.

DISCLOSURE OF INVENTION (1) A hollow structure plate according to the present invention is a hollow structure plate formed by fusing a plurality of hollow protrusions that are projected in each of two thermoplastic resin sheets with the hollow protrusions facing against one another. The hollow protrusions are truncated cone-shaped. A ratio of a total area of a lower base of each of the hollow protrusions to an area of a circumferential surface, i.e., a ratio between the total area of the lower base (opening) portions of the hollow protrusions and the area of the liner portions in which the hollow protrusions are not formed, is in a range from 0.3 to 0.9. A rising angle of a side face of each of the hollow protrusions in a vertical plane including a central axis of the hollow protrusion is in a range from 50 degrees to 70 degrees.

(2) A method for manufacturing a hollow structure plate according to the present invention comprises: introducing two thermoplastic resin sheets into a pressure-reduced chamber; attracting and attaching the resin sheets respectively to a circumferential surface of each of a pair of upper and lower emboss rollers that are arranged rotatably in the pressure-reduced chamber to form a multitude of hollow protrusions on each of the resin sheets in accordance with a shape of a pin projected in each of the emboss rollers; and thermally fusing the end faces of the hollow protrusions in a position of, a contact line, i.e., a contact point, of the emboss rollers. Introduction guides are arranged respectively above and below a sheet-introducing opening portion of the pressure-reduced chamber, each of the introduction guides being inclined toward a direction of the contact line, i.e., the contact point, of each of the emboss rollers. Heating means for thermal fusion is provided between the introduction guides, the heating means being arranged in a non-contact manner between the resin sheets. Each of the resin sheets is attracted and attached respectively to the circumferential surface of each of the emboss rollers under a reduced pressure by maintaining opposing surfaces of the resin sheets in the pressure-reduced chamber at an atmospheric pressure and reducing a pressure at surfaces opposite therefrom.

In the present invention, it is possible to provide means for inserting and guiding laterally-opposite side portions of each of the resin sheets along opposite side portions of the emboss rollers, and/or to laminate a surface material on an upper and a lower surface of the hollow structure plate subsequently after the hollow structure plate is molded.

Another method for manufacturing a hollow structure plate according to the present invention comprises: introducing two thermoplastic resin sheets into a pressure-reduced chamber; attracting and attaching the resin sheets respectively to a circumferential surface of each of a pair of upper and lower emboss rollers that are arranged rotatably in the pressure-reduced chamber to form a multitude of hollow protrusions on each of the resin sheets in accordance with a shape of a pin projected in each of the emboss rollers; and thermally fusing the end faces of the hollow protrusions in a position of a contact line, i.e., a contact point, of the emboss rollers continuously. Emboss rollers satisfying the following conditions are used: the pin is truncated cone-shaped; a ratio of a total area of a lower base of the pin to an area of the circumferential surface of the emboss roller, i.e., a ratio between the total area of the lower base (opening) portions of the hollow protrusions and the area of the liner portions in which the hollow protrusions are not formed, is in a range from 0.3 to 0.9; and a rising angle of a side face of the pin in a vertical plane including a central axis of the pin is in a range from 50 degrees to 70 degrees.

(3) An apparatus for manufacturing a hollow structure plate according to the present invention comprises: a pressure-reduced chamber that is evacuated to reduce a pressure inside; a pair of upper and lower emboss rollers that are supported with bearings rotatably in the pressure-reduced chamber in a state in which circumferential surfaces of the rollers face a front opening portion of the pressure-reduced chamber, a pin provided on one of the rollers being brought into contact with a pin provided on the other via a resin sheet in a position of a contact line, i.e., a contact point; sheet-introduction plates that are arranged respectively above and below the front opening portion, each of the sheet-introduction plates being inclined toward a direction of the contact line, i.e., the contact point, of each of the emboss rollers; a plurality of border rollers that are supported rotatably on an inner side of opposite side portions of the pressure-reduced chamber; a pair of border-roller receiving and quasi-sealing members that are opposed respectively to the border rollers with a small gap therebetween and that are arranged on both sides of each of the emboss rollers to quasi-seal both sides of the emboss roller in the pressure-reduced chamber; rear plates that are continuous toward a rear opening portion of the pressure-reduced chamber, each of the rear plates being arranged horizontally toward a direction of the contact line, i.e., the contact point, of each of the emboss rollers on the rear side thereof; and a heater for heating that is arranged between the introduction plates. Herein, the degree of the quasi-sealing includes a degree very close to complete sealing, and it is preferable that the degree of the reduced pressure in the pressure-reduced chamber 10, which will be described later, is about 300 to 2000 mm $H_2O$.

Another apparatus for manufacturing a hollow structure plate according to the present invention comprises: a pressure-reduced chamber that is evacuated to reduce a pressure inside; a pair of upper and lower emboss rollers that are supported with bearings rotatably in the pressure-reduced chamber in a state in which circumferential surfaces of the rollers face a front opening portion of the pressure-reduced chamber, a pin provided on one of the rollers being brought into contact with a pin provided on the other via two thermoplastic resin sheets in a position of a contact line, i.e., a contact point; and a heater for heating that is arranged at the front opening portion. The pin of each of the emboss rollers is truncated cone-shaped. A ratio of a total area of a lower base of the pin to an area of the circumferential surface of the emboss roller, i.e., a ratio between the total area of the lower base (opening) portions of the hollow protrusions and the area of the liner portions in which the hollow protrusions are not formed, is in a range from 0.3 to 0.9. A rising angle of a side face of the pin in a vertical plane including a central axis of the pin is in a range from 50 degrees to 70 degrees.

(4) A sound absorbing structure plate according to the present invention comprises a multilayer hollow structure plate constituted by attaching non-air-permeable sheets onto front and back sides of a core member obtained by fusing a plurality of hollow protrusions that are projected in each of two thermoplastic resin sheets with the hollow protrusions facing against one another. A small hole opened between the hollow protrusions, i.e., in the liner portions in which the hollow protrusions are not formed (which appear like recesses after the sheet is formed), on at least one of the front and back sides of the multilayer hollow structure plate is formed.

In the sound absorbing structure plate according to the present invention, it is possible to attach a sound absorbing material, for example, a porous sheet such as an urethane foam sheet, a non-woven fabric, and a woven fabric, onto the side on which the small hole is formed in the hollow structure plate, and/or to provide the hollow structure plate with a Metsuke (weight per unit area) of from 700 to 3000 g/m².

BRIEF DESCRIPTION OF DRAWINGS

FIGS. 2(a) to 2(d) show preferable embodiments of a sound absorbing structure plate of the present invention.

BEST MODE FOR CARRYING OUT THE INVENTION

Hereinafter, preferred embodiments of the present invention will be described with reference of the accompanying drawings in detail.

Figure 1:
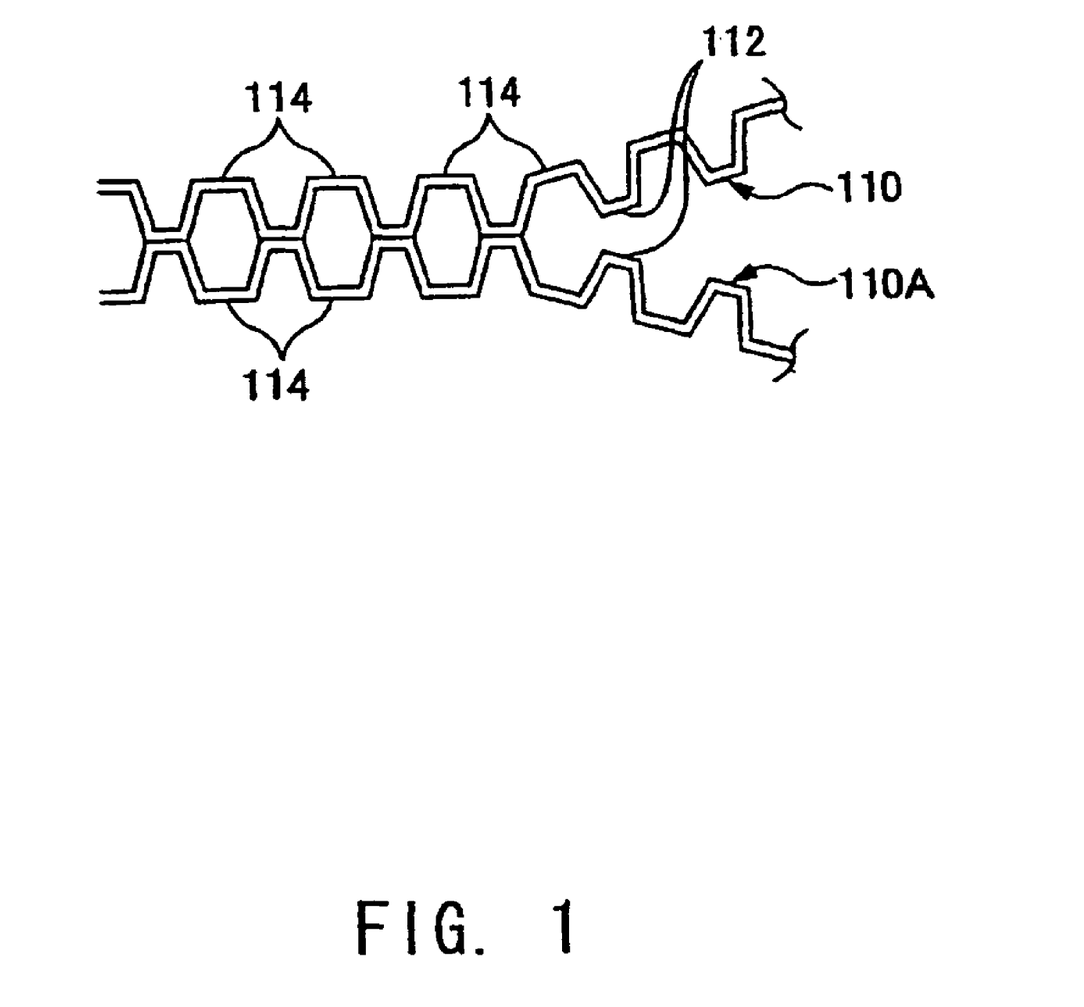
FIG. 1 is an explanatory diagram showing a hollow structure plate of the present invention.

As shown in FIG. 1, the hollow structure plate of the present invention is formed by fusing a plurality of hollow protrusions (referred to as "pins" or "emboss pins" in the examples) 112, 112 that are projected (embossed) in two thermoplastic resin sheets 110, 110A with the end faces attached to each other, and characterized by the following: the pins 112, 112 are truncated cone-shaped; the ratio of the total area of the lower bases of the pins 112, 112 to the circumferential surface is in the range from 0.3 to 0.9; and the rising angle of the side face of each pin 112, 112 in the vertical plane including the central axis of the pin 112, 112 is in the range from 50 degrees to 70 degrees. Such a hollow structure plate also can be constituted by attaching non-air-permeable sheets (not shown) made of thermoplastic resin sheets to liner portions (i.e., portions between the pins 112, 112 in the thermoplastic resin sheets 110, 110a) 114, 114 on both the front and back sides thereof.

As the resin sheet 3 used in the present invention, polyolefin resin sheets, in particular, polypropylene sheets are preferable, but other thermoplastic resin materials in general can be applied, and setting of a relevant part of the apparatus can be changed, depending on various temperature characteristics such as the melting point, the softening point, and the glass transition temperature, or the properties of the material.

EXAMPLE 1 OF THE HOLLOW STRUCTURE PLATE

A homopropylene sheet (melting point: 165° C., softening point: 120° C.) having a thickness of 0.5 mm and a Metsuke (weight per unit area) of 500 g/m² in the melted state was placed on a vacuum molding plate having a width of 70 mm and a length of 200 mm in which pins 11b, whose height is 5 mm and whose diameter of the upper base 11d is 2 mm and diameter of the lower base 11e is 8 mm, were arranged in a staggered lattice arrangement with a pin interval (interval between the rising portions 11g) of 2 mm, and vacuum molding was performed in off-line. The obtained two embossed sheets were attached in such a manner that the pins thereof were attached with an ultrasonic fusing apparatus. Using this as a core member, homopropylene sheets having a thickness of 0.25 mm and a Metsuke of 250 g/m² were attached as face material to the front and the back of this core member. Thus, a hollow structure plate having a thickness of 10.5 mm and a Metsuke of 1500 g/m² was obtained. Thereafter, a bending test was performed according to JIS K7203. Regarding the bending elasticity gradient, a load when a flexure of 1 cm occurred was obtained based on the straight portion of a load-flexure curve obtained by the above-described bending measurement, and this was taken as the bending elasticity gradient.

EXAMPLE 2 OF THE HOLLOW STRUCTURE PLATE

A hollow structure plate was obtained in the same manner as Example 1, using a vacuum molding plate having a width of 70 mm and a length of 200 mm in which pins 11b, whose height is 5 mm and whose diameter of the upper base 11d is 2 mm and diameter of the lower base 11e is 6 mm, were arranged in a staggered lattice arrangement with a pin interval of 2 mm. Thereafter, a bending test was performed.

EXAMPLE 3 OF THE HOLLOW STRUCTURE PLATE

A hollow structure plate was obtained in the same manner as Example 1, using a vacuum molding plate having a width of 70 mm and a length of 200 mm in which pins 11b, whose height is 5 mm and whose diameter of the upper base 11d is 2 mm and diameter of the lower base 11e is 6 mm, were arranged in a staggered lattice arrangement with a pin interval of 4 mm. Thereafter, a bending test was performed.

EXAMPLE 4 OF THE HOLLOW STRUCTURE PLATE

A hollow structure plate was obtained in the same manner as Example 1, using a vacuum molding plate having a width of 70 mm and a length of 200 mm in which pins 11b, whose height is 5 mm and whose diameter of the upper base 11d is 4 mm and diameter of the lower base 11e is 8 mm, were arranged in a staggered lattice arrangement with a pin interval of 2 mm. Thereafter, a bending test was performed.

EXAMPLE 5 OF THE HOLLOW STRUCTURE PLATE

A hollow structure plate was obtained in the same manner as Example 1, using a vacuum molding plate having a width of 70 mm and a length of 200 mm in which pins 11b, whose height is 5 mm and whose diameter of the upper base 11d is 2 mm and diameter of the lower base 11e is 10 mm, were arranged in a staggered lattice arrangement with a pin interval of 2 mm. Thereafter, a bending test was performed.

EXAMPLE 6 OF THE HOLLOW STRUCTURE PLATE

The pin was configured to have a step. A hollow structure plate was obtained in the same manner as Example 1, using a vacuum molding plate having a width of 70 mm and a length of 200 mm in which pins 11b, whose height is 5 mm and whose diameters of the upper base 11d, the inner side of the intermediate state, the outer side of the intermediate stage, and the lower base 11e are 1.5 mm, 3 mm, 5 mm, and 6 mm, respectively, were arranged in a staggered lattice arrangement with a pin interval of 2 mm. Thereafter, a bending test was performed.

COMPARATIVE EXAMPLE 1 OF THE HOLLOW STRUCTURE PLATE

A hollow structure plate was obtained in the same manner as Example 1, using a vacuum molding plate having a width of 70 mm and a length of 200 mm in which pins 11b, whose height is 5 mm and whose diameter of the upper base 11d is 4 mm and diameter of the lower base 11e is 6 mm, were arranged in a staggered lattice arrangement with a pin interval of 4 mm. Thereafter, a bending test was performed.

COMPARATIVE EXAMPLE 2 OF THE HOLLOW STRUCTURE PLATE

A hollow structure plate was obtained in the same manner as Example 1, using a vacuum molding plate having a width of 70 mm and a length of 200 mm in which pins 11b, whose height is 5 mm and whose diameter of the upper base 11d is 2 mm and diameter of the lower base 11e is 4 mm, were arranged in a staggered lattice arrangement with a pin interval of 4 mm. Thereafter, a bending test was performed.

COMPARATIVE EXAMPLE 3 OF THE HOLLOW STRUCTURE PLATE

A hollow structure plate was obtained in the same manner as Example 1, using a vacuum molding plate having a width of 70 mm and a length of 200 mm in which pins 11b, whose height is 5 mm and whose diameter of the upper base 11d is 6 mm and diameter of the lower base 11e is 8 mm, were arranged in a staggered lattice arrangement with a pin interval of 4 mm. Thereafter, a bending test was performed.

COMPARATIVE EXAMPLE 4 OF THE HOLLOW STRUCTURE PLATE

Molding was performed in the same manner as Example 1, using a vacuum molding plate having a width of 70 mm and a length of 200 mm in which pins 11b, whose height is 5 mm and whose diameter of the upper base 11d is 4 mm and diameter of the lower base 11e is 6 mm, were arranged in a staggered lattice arrangement with a pin interval of 2 mm. Webbing occurred, and a satisfactory hollow structure plate was not obtained.

COMPARATIVE EXAMPLE 5 OF THE HOLLOW STRUCTURE PLATE

A hollow structure plate was obtained in the same manner as Example 1, using a vacuum molding plate having a width of 70 mm and a length of 200 mm in which pins 11b, whose height is 5 mm and whose diameter of the upper base 11d is 2 mm and diameter of the lower base 11e is 12 mm, were arranged in a staggered lattice arrangement with a pin interval of 2 mm. Thereafter, a bending test was performed.

-Test Results-

Table 1 shows the results of the bending tests of the above examples and comparative examples.

TABLE 1

| | pin diameter ($\phi$) (upper base-lower base) | pin interval (mm) | ratio of total area of pin lower base*1 | pin rising angle (°) | bending elasticity gradient (N/cm) |
|---|---|---|---|---|---|
| Ex. 1 | 2-8 | 2 | 0.58 | 61 | 530 |
| Ex. 2 | 2-6 | 2 | 0.51 | 68 | 500 |
| Ex. 3 | 2-6 | 4 | 0.33 | 68 | 420 |
| Ex. 4 | 4-8 | 2 | 0.58 | 68 | 430 |
| Ex. 5 | 2-10 | 2 | 0.63 | 51 | 410 |
| Ex. 6*2 | 1.5-(3-5)-6 | 2 | 0.51 | — | 530 |
| Com. Ex. 1 | 4-6 | 4 | 0.33 | 79 | 310 |
| Com. Ex. 2 | 2-4 | 4 | 0.23 | 79 | 340 |
| Com. Ex. 3 | 6-8 | 4 | 0.40 | 79 | 325 |
| Com. Ex. 4 | 4-6 | 2 | 0.51 | 79 | webbing |
| Com. Ex. 5 | 2-12 | 2 | 0.74 | 45 | 280 |

*1 when taking the total area of an embossed sheet (one face) as 1.
*2 a pin having a step The above results make it clear that the above-described Examples have the effect of the present invention, as evident in contrast to the Comparative Examples.

The present invention not only allows hollow protrusion processing and melt joining of two thermoplastic resin sheets that have been extrusion-molded to be performed reliably in a short time and facilitates the temperature control, but also enables a hollow structure plate having good bending characteristics to be manufactured.

FIGS. 2(a) to 2(d) show preferable embodiments in which the hollow structure plate is used as a sound absorbing structure plate of the present invention. The sound absorbing structure plate shown in these figures is provided with a hollow structure plate 140 and a sound absorbing material 150. The hollow structure plate 140 is constituted by attaching non-air-permeable sheets 130, 130A made of thermoplastic resin sheets to liner portions (i.e., portions between the hollow protrusions 112, 112 in the thermoplastic resin sheets 110, 110a) 114, 114 of the core member 120 on both the front and back sides thereof. The core member 120 is formed by fusing a plurality of hollow protrusions (also referred to as "pins" or "emboss pins") 112, 112 that are projected (embossed) in two thermoplastic resin sheets 110 and 110A with their end faces attached facing each other. The sound absorbing material 150 is made of porous material that is attached to at least one of the two faces of the front and the back of the hollow structure plate 140. Small holes 114a, 130a that are opened toward the closed spaces 142, 142 in the hollow structure plate 140 are formed in the liner portions 114 of the thermoplastic resin sheet 110 that is positioned on the side to which the sound absorbing material 150 is attached, and in the non-air permeable sheet 130 only at the positions that match the liner portions 114.

According to this embodiment, noise in a relatively high frequency band can be absorbed with the sound absorbing material 150, and noise in a relatively low frequency band can be absorbed by achieving a resonant absorbing effect of the hollow portions (air layers) of the hollow structure plate 140 that are opened through the small holes 130a and 114a. Thus, a sound absorbing structure plate having high absorbency throughout the audible range, without canceling out the effect of one another, can be obtained.

In addition, since the thermoplastic resin sheets 110, 110A are main members, the sound absorbing structure plate is lightweight, and further, since the hollow protrusions 112, 112 are fused with their end faces attached facing each other, the sound absorbing structure plate has high strength and high rigidity.

There is no limitation regarding the thermoplastic resin that is the raw material for the core member 120. However, in view of the balance between the cost, the formability, the properties, and other characteristics, polypropylene is preferable. There is no limitation regarding the raw material of the non-air-permeable sheets that are attached to both faces of the core member. However, in view of the balance between the cost, the formability, the properties, and other characteristics, polypropylene is preferable. Moreover, fillers such as mica and talc or modifiers such as a flame retardant for providing flame resistance can be added to these raw materials. The sound structure plate can be provided with excellent recycling properties by using polypropylene.

It is preferable that the Metsuke (weight per unit area) of the hollow structure plate 140 is approximately from 700 to 3000 g/m². When the Metsuke is too small, the thickness of the hollow protrusions 112, 112 is too small and they are made into films, and therefore sufficient strength and rigidity cannot be obtained. On the other hand, when the Metsuke is too large, the advantage of light weight may be impaired. The thickness is preferably, for example, approximately from 6 to 15 mm, depending on the application. The hollow protrusions 112, 112 of the thermoplastic resin sheets 110, 110a constituting the hollow structure plate 140 are hollow conical in the figures, but may be hollow cylindrical.

As shown in FIG. 2(c), the small holes 114a, 130a are not necessarily provided in every interval between the hollow protrusions 112, and can be provided at an appropriate pitch. It is preferable that the hole diameter is from $\phi$ 0.3 to 7.0 mm. When the diameter is smaller than 0.3 mm, processing is difficult, and when it exceeds 7.0 mm, not only is processing difficult, but also does the rigidity deteriorate, because the leg portion of the hollow protrusion 112 is destroyed at the time of opening holes. More preferably, it is from $\phi$ 0.5 to 4.0 mm. Furthermore, there is no limitation regarding the number and the total area of the small holes. The hole diameter can be selected as appropriate within the above-described range, and can be adjusted in accordance with a specific frequency that is desired to be absorbed, depending on the application. The small holes can be formed by a method having processing properties that can be selected as appropriate, such as drilling, needling, and punching.

Figure 2:
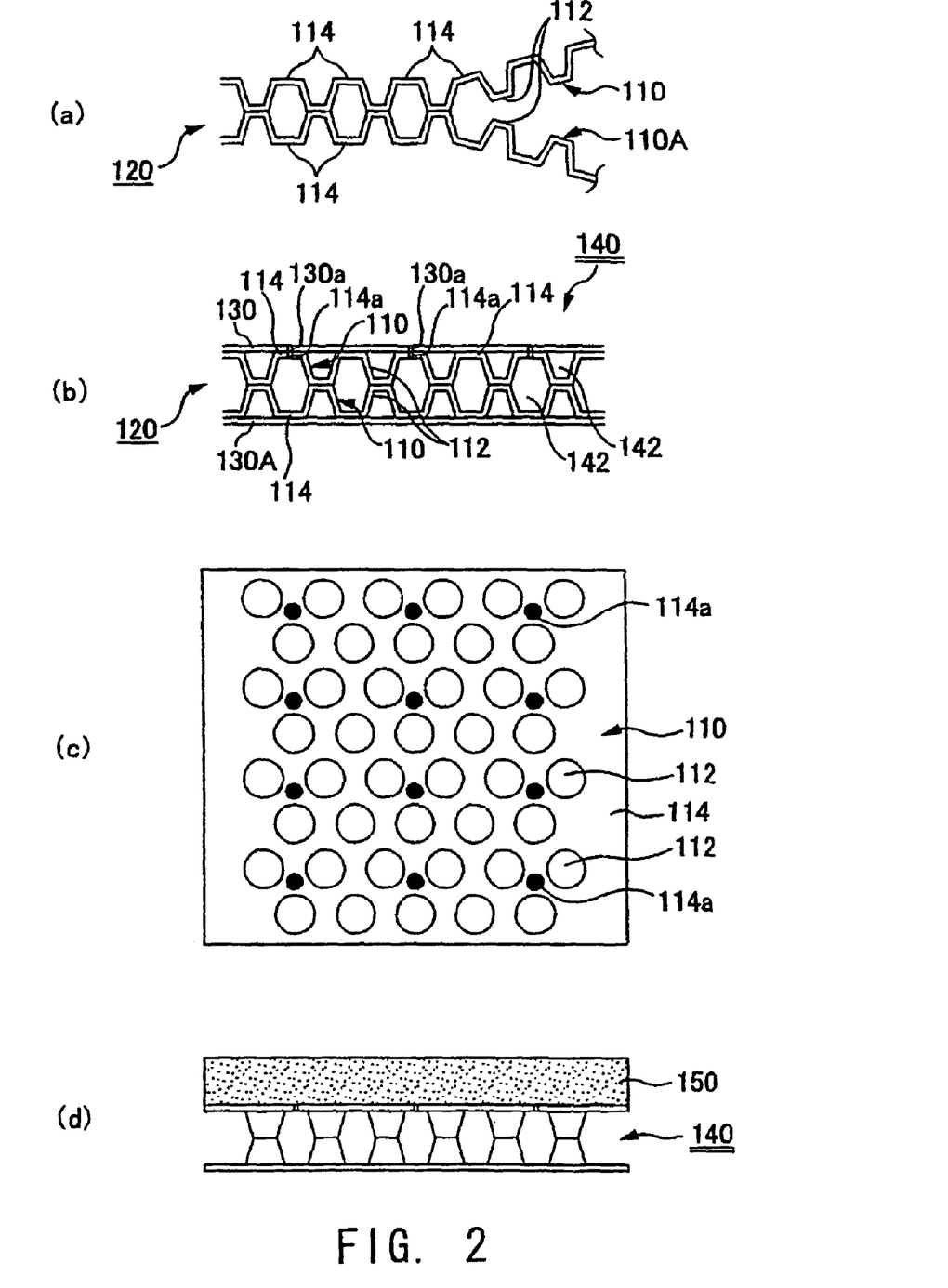
FIG. 2(a) is a cross-sectional view showing the state in the middle of manufacturing.
FIG. 2(b) is a cross-sectional view showing a hollow structure plate that is an intermediate product.
FIG. 2(c) is a plan view of FIG. 2(b)
FIG. 2(d) is a cross-sectional view of a sound absorbing structure plate that is a final product.
Figure 3:
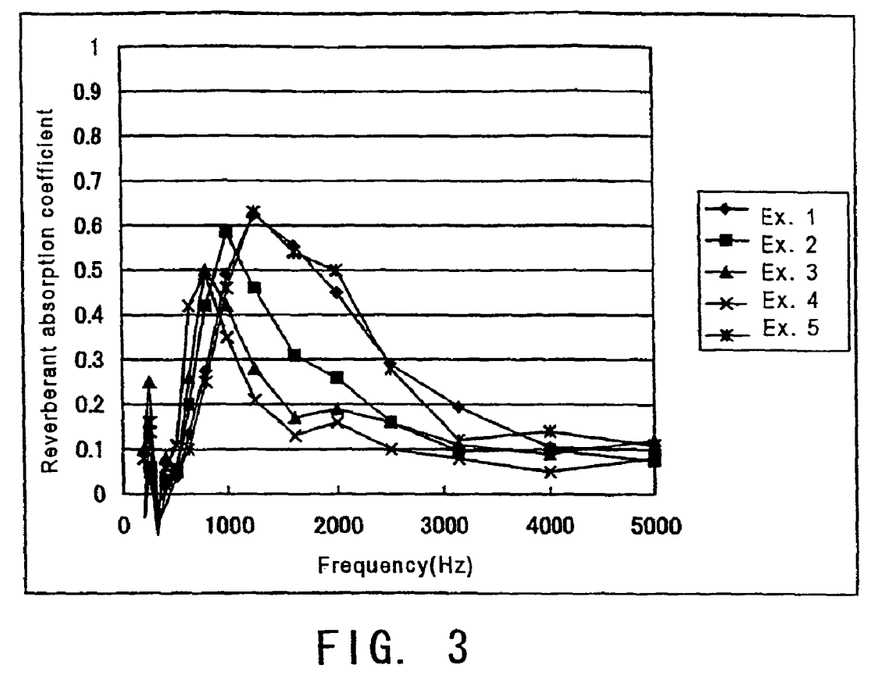
FIG. 3 is a correlation diagram of the frequency and the reverberant absorption coefficient in Examples 1 to 5.
Figure 4:
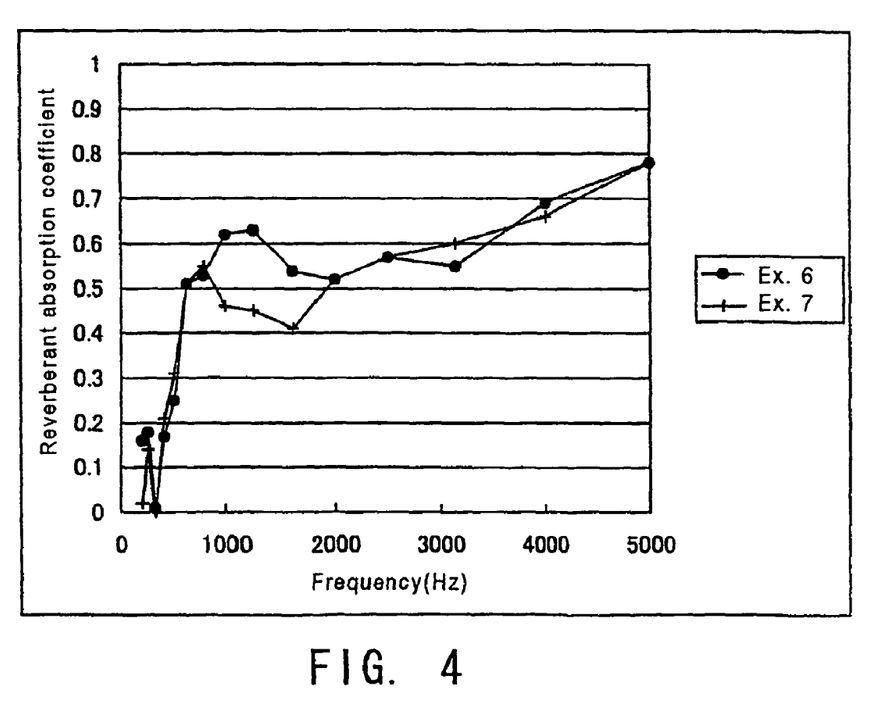
FIG. 4 is a correlation diagram of the frequency and the reverberant absorption coefficient in Examples 6 and 7.
Figure 5:
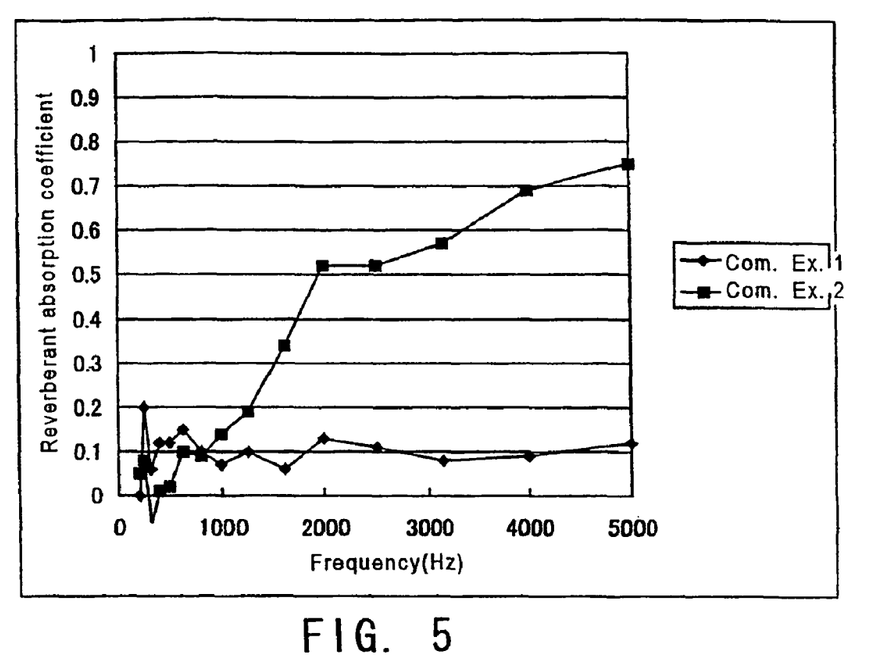
FIG. 5 is a correlation diagram of the frequency and the reverberant absorption coefficient in Comparative Examples 1 and 2.
Figure 6:
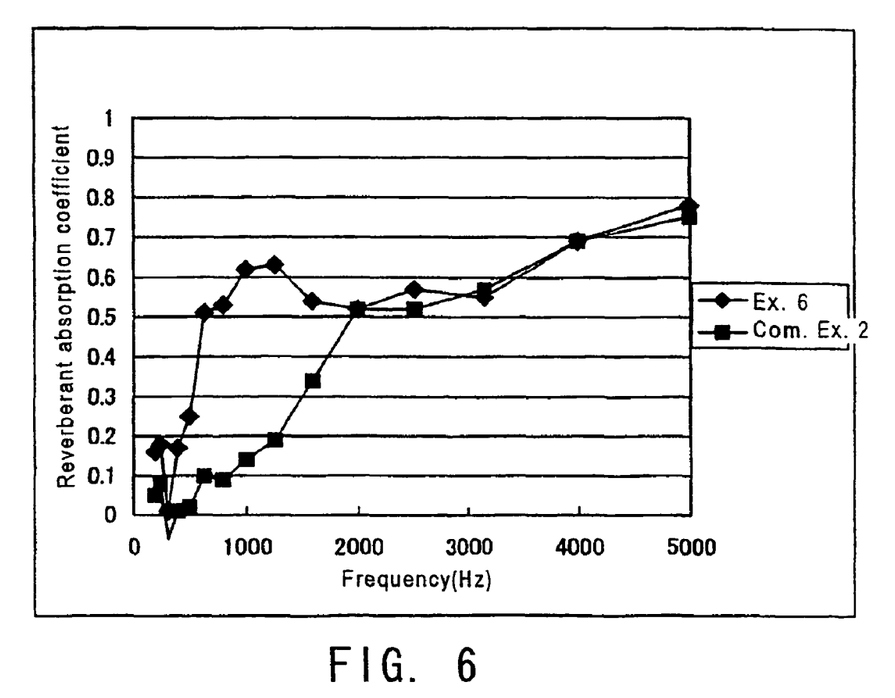
FIG. 6 is a correlation diagram of the frequency and the reverberant absorption coefficient in Example 6 and Comparative Example 2.

In FIG. 2, the small holes 114a, 130a are formed only in the liner portions 114 of the thermoplastic resin sheet 110 positioned on the side (the upper side in FIG. 2) to which the sound absorbing material is attached and the non-air permeable sheet 130 that matches therewith, but they may be formed in the end faces and circumferential faces of the hollow protrusions 112 of the thermoplastic resin sheet 110. Moreover, the small holes 114a, 130a may also be formed in the liner portions 114 of the thermoplastic resin sheet 110A positioned on the side to which the sound absorbing material is not attached (the lower side in FIG. 2) and the non-air permeable sheet 130A that matches therewith. In this case, the positions of the small holes 114a, 130a may be matched between both the front and back sides of the hollow structure plate 140, or do not have to be matched. The hole diameter and/or the pitch of all the small holes 114a, 130a in the present invention do not necessarily have to be equal, and the small holes may be arranged either regularly or irregularly.

In this embodiment, a multilayered hollow structure plate is configured by attaching the sound absorbing material 150 only on one face (the side on which the small hole 114a is formed in the liner portions 114 of the thermoplastic resin sheet 110) of the hollow structure plate 140. However, the sound absorbing material 150 may also be attached to the other face of the hollow structure plate 140. The sound absorbing material 150 is, for example, a foam member such as a sponge member having continuous air bubbles, and attaching a porous material such as a non-woven fabric can further enhance the sound absorbing effect.

EXAMPLE 1

A homopolypropylene sheet (melting point: 165° C., softening point: 120° C.) having a thickness of 0.5 mm and a Metsuke (weight per unit area) of 500 g/m² in the melted state was placed on a vacuum molding plate having a length of 1000 mm and a width of 1000 mm in which hollow protrusions (emboss pins), whose height is 5.5 mm and whose diameter of the upper base is 2 mm and diameter of the lower base is 6 mm, were arranged in a staggered lattice arrangement with a pin interval of 2 mm, and vacuum molding was performed in off-line. The ends of the protrusions of the obtained two embossed sheets were thermally fused. Using this as a core member, homopolypropylene sheets having a thickness of 0.25 mm and a Metsuke of 250 g/m² were attached as face material to the front and the back of this core member. Thus, a hollow structure plate having a total thickness of 11.5 mm and a Metsuke of 1500 g/m² was obtained. Thereafter, a hole-opening process was performed to one of the liner portions of the hollow structure plate such that holes of $\phi$ 1.0 were formed at an equal pitch at an opening ratio of 0.36%. The sound absorption coefficient of this perforated hollow structure plate of 1×1 m was measured in a small reverberant chamber (manufactured by Nittobo Acoustic Engineering Co., Ltd.).

EXAMPLE 2

A hollow structure plate was obtained in the same manner as in Example 1, and then a hole-opening process was performed to one of the liner portions of the hollow structure plate such that holes of ϕ 2.5 mm were formed at an equal pitch at an opening ratio of 0.36%. The sound absorption coefficient of this perforated hollow structure plate was measured in a small reverberant chamber.

EXAMPLE 3

A hollow structure plate was obtained in the same manner as in Example 1, and then a hole-opening process was performed to one of the liner portions of the hollow structure plate such that holes of ϕ 4.0 mm were formed at an equal pitch at an opening ratio of 0.36%. The sound absorption coefficient of this perforated hollow structure plate was measured in a small reverberant chamber.

EXAMPLE 4

A hollow structure plate was obtained in the same manner as in Example 1, and then a hole-opening process was performed to one of the liner portions of the hollow structure plate such that holes of ϕ 2.5 mm were formed at an equal pitch at an opening ratio of 0.19%. The sound absorption coefficient of this perforated hollow structure plate was measured in a small reverberant chamber.

EXAMPLE 5

A hollow structure plate was obtained in the same manner as in Example 1, and then a hole-opening process was performed to one of the liner portions of the hollow structure plate such that holes of ϕ 2.5 mm were formed at an equal pitch at an opening ratio of 0.66%. The sound absorption coefficient of this perforated hollow structure plate was measured in a small reverberant chamber.

EXAMPLE 6

A hollow structure plate was obtained in the same manner as in Example 1, and then a soft urethane foam having a thickness of 6 mm was attached as a sound absorbing material to the face having the holes of this hollow structure plate, so that a multilayered hollow structure plate was produced. Then, the sound absorption coefficient was measured in a small reverberant chamber (t=1 means a thickness of 1 mm).

EXAMPLE 7

A hollow structure plate having holes was obtained in the same manner as in Example 2, and then an air-permeable surface material having a thickness of 6 mm and a soft urethane foam (t=5) were attached as sound absorbing materials to the face having the holes of this hollow structure plate, so that a multilayered hollow structure plate was produced. Then, the sound absorption coefficient was measured in a small reverberant chamber.

COMPARATIVE EXAMPLE 1

A hollow structure plate was produced in the same manner as in Example 1, and the sound absorption coefficient was measured in a small reverberant chamber.

COMPARATIVE EXAMPLE 2

The sound absorption coefficient of a soft urethane foam having a thickness of 6 mm was measured in a small reverberant chamber.

COMPARATIVE EXAMPLE 3

A hollow structure plate was obtained in the same manner as in Example 1, and a multilayered hollow structure plate was produced by attaching a sound absorbing material made of a foam material under the same conditions as in Example 6, except that no holes were opened. Then, the sound absorption coefficient was measured according to the reverberant chamber method. The sound absorption coefficient in certain frequencies of Comparative Example 3 is shown in Table 2.

Table 2 show the results of measuring the reverberant sound absorption coefficient of Examples 1 to 7 and Comparative Examples 1 to 3, and Table 3 shows the bending elasticity gradient.

TABLE 2

Results of measuring the reverberant sound absorption coefficient

| frequency (Hz) | Ex. 1 | Ex. 2 | Ex. 3 | Ex. 4 | Ex. 5 | Ex. 6 | Ex. 7 | Com. Ex. 1 | Com. Ex. 2 | Com. Ex. 3 |
|---|---|---|---|---|---|---|---|---|---|---|
| 200 | −0.03 | −0.03 | 0.10 | −0.05 | 0.08 | 0.16 | 0.02 | 0.00 | 0.05 | 0.05 |
| 250 | 0.04 | 0.06 | 0.25 | 0.14 | 0.16 | 0.18 | 0.14 | 0.20 | 0.08 | 0.07 |
| 315 | −0.07 | −0.09 | −0.06 | −0.04 | −0.08 | 0.01 | −0.01 | 0.06 | −0.06 | −0.03 |
| 400 | −0.02 | 0.03 | 0.08 | 0.06 | 0.02 | 0.17 | 0.21 | 0.12 | 0.01 | 0.00 |
| 500 | 0.04 | 0.06 | 0.05 | 0.11 | 0.05 | 0.25 | 0.31 | 0.12 | 0.02 | 0.02 |
| 630 | 0.14 | 0.20 | 0.26 | 0.42 | 0.10 | 0.51 | 0.51 | 0.15 | 0.10 | 0.09 |
| 800 | 0.28 | 0.42 | 0.50 | 0.49 | 0.25 | 0.53 | 0.55 | 0.10 | 0.09 | 0.10 |
| 1000 | 0.49 | 0.50 | 0.42 | 0.35 | 0.46 | 0.62 | 0.46 | 0.07 | 0.14 | 0.15 |
| 1250 | 0.63 | 0.46 | 0.28 | 0.21 | 0.63 | 0.63 | 0.45 | 0.10 | 0.19 | 0.19 |
| 1600 | 0.56 | 0.31 | 0.17 | 0.13 | 0.54 | 0.54 | 0.41 | 0.06 | 0.34 | 0.33 |
| 2000 | 0.45 | 0.26 | 0.19 | 0.16 | 0.50 | 0.52 | 0.52 | 0.13 | 0.52 | 0.52 |
| 2500 | 0.29 | 0.16 | 0.16 | 0.10 | 0.28 | 0.57 | 0.57 | 0.11 | 0.52 | 0.50 |
| 3150 | 0.20 | 0.10 | 0.11 | 0.08 | 0.12 | 0.55 | 0.60 | 0.08 | 0.57 | 0.58 |
| 4000 | 0.11 | 0.10 | 0.09 | 0.05 | 0.14 | 0.69 | 0.66 | 0.09 | 0.69 | 0.70 |
| 5000 | 0.10 | 0.08 | 0.12 | 0.08 | 0.11 | 0.78 | 0.78 | 0.12 | 0.75 | 0.74 |

TABLE 3

| | hole diameter (mmφ) | opening ratio (%) | bending elasticity gradient (N/cm) | note |
|---|---|---|---|---|
| Ex. 1 | 1.0 | 0.36 | 600 | |
| Ex. 2 | 2.5 | 0.36 | 600 | |
| Ex. 3 | 4.0 | 0.36 | 580 | |
| Ex. 4 | 2.5 | 0.19 | 620 | |
| Ex. 5 | 2.5 | 0.66 | 590 | |
| Ex. 6 | 1.0 | 0.36 | 610 | |
| Ex. 7 | 2.5 | 0.36 | 600 | |
| Com. Ex. 1 | — | 0 | 600 | Ex. 1, no hole |
| Com. Ex. 2 | — | 0 | 330 | Ex. 2, PP sheet attached to one face, no hole + foam material |
| Com. Ex. EX | — | 0 | 610 | Com. Ex. 1 + foam material |

FIGS. 3 to 6 are correlation diagrams of the frequency and the reverberant sound absorption coefficient in Examples 1 to 7 and Comparative Examples 1 to 3. Tables 2 and 3 and FIGS. 3 to 6 indicate the following.

In Examples 1 to 5, it was confirmed that noise in a relatively low frequency band can be absorbed. Furthermore, it was proved that the natural frequency can be changed by changing the size of the small holes, the opening ratio, etc., and thus that the degree of freedom in designing for use as a sound absorbing material is large.

For porous materials such as foam materials having continuous air bubbles and non-woven fabrics, the larger the thickness is, the higher the sound absorption performance becomes. When there is a limitation of the thickness, the sound absorption performance, especially in the low or medium frequency range, deteriorates. Therefore, as in Examples 6 and 7, a multilayered hollow structure plate is produced by attaching a relatively thin porous sheet as a sound absorbing material to the face having holes of the hollow structure plate so that the merits of the two members are reinforced by each other. Thus, it has been proven that in this way, the sound absorption performance is enhanced over a wide range of frequency bands.

Furthermore, it was also confirmed that the sound absorption coefficient of the multilayered hollow structure plate shown as Comparative Example 3, which was produced by attaching a surface material and a foam material without opening a hole in the hollow structure plate, was substantially equal to that of the soft urethane foam material of Comparative Example 2.

Furthermore, Table 3 indicates that the bending elasticity gradient of the sound absorbing plate of the present Examples is large and exhibits relatively high rigidity.

As evident from the above description, according to the sound absorbing structure plate of the present invention, the sound absorbency can be provided with a small increase in the weight and without reducing the rigidity. Furthermore, the sound absorbing characteristics for any frequency band can be provided by combining another sound absorbing material. Moreover, the sound absorbing structure plate can be recycled easily by selecting the material. As a result, the sound absorbing structure plate can be used preferably as a sound absorbing interior material of building or vehicles.

The hollow structure plate or the sound absorbing structure plate of the present invention described above can be produced preferably with a manufacturing apparatus described below by a manufacturing method described below.

Figure 7:
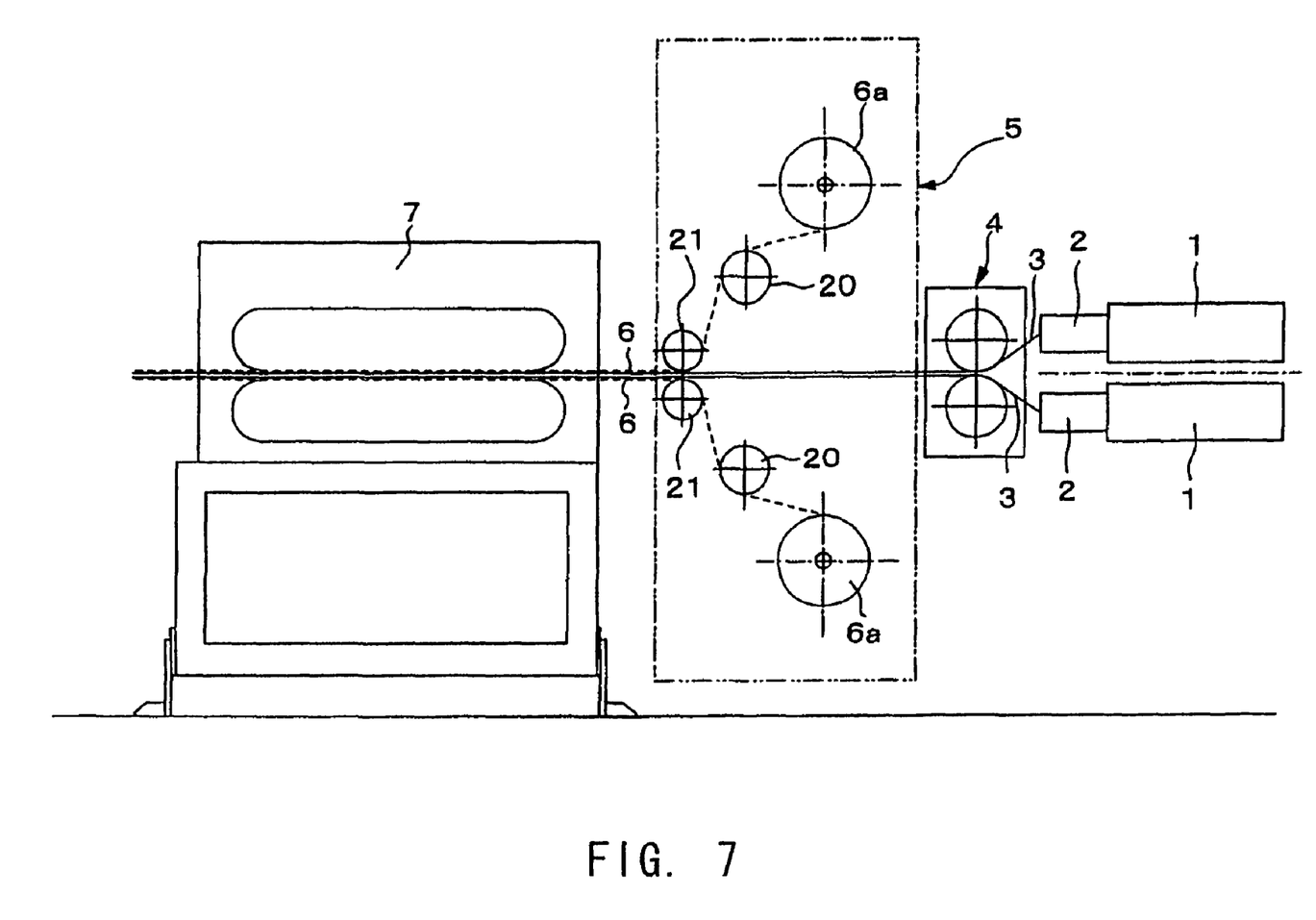
FIG. 7 is an explanatory diagram showing the entire structure of an apparatus to which the present invention is applied.

FIG. 7 shows the entire configuration of an apparatus to which the method of the present invention is applied. In FIG. 7, T-dies 2 are provided at each end of a pair of extruders 1 that are arranged in parallel. As regards the thermoplastic resin sheets 3 extruded from the T-dies 2, protrusions of the resin sheets 3 are molded and the sheets are attached using a molding apparatus or a manufacturing apparatus of the present invention (hereinafter, referred to as a "manufacturing apparatus", but both mean the same) 4 that performs both molding of protrusions and attachment. Thereafter, surface materials 6 are laminated on the upper and the lower surfaces thereof with a laminating apparatus 5, and the laminated sheets are taken up by a take-up device 7 at a predetermined speed. Then, the sheets are sequentially cut by a cutting device, which is not shown, so as to be completed as a product.

Figure 8:
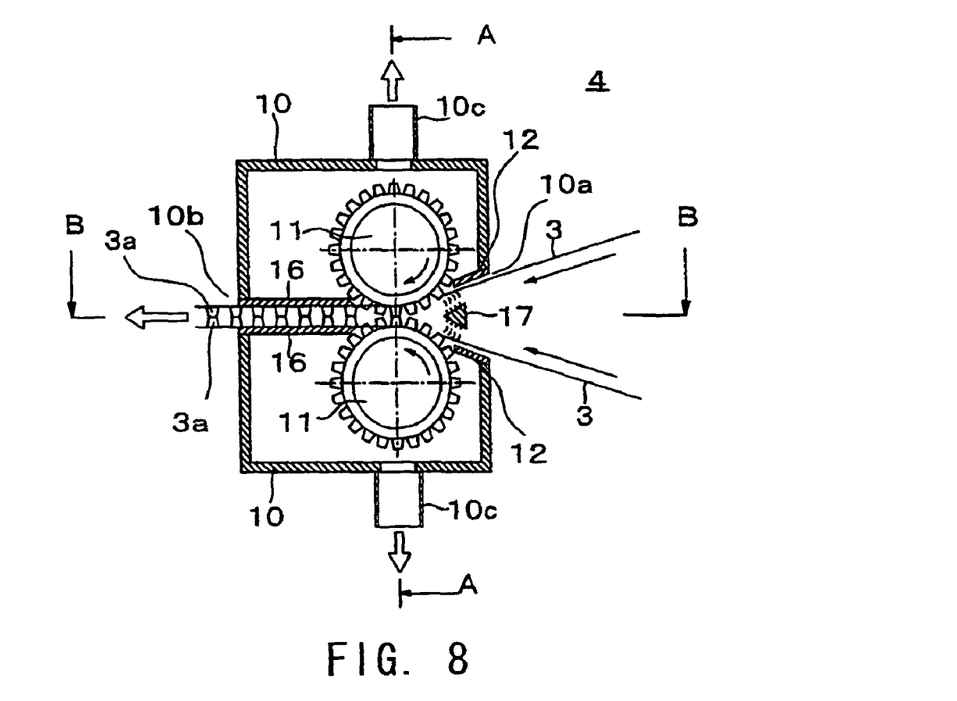
FIG. 8 is a side-cross-sectional explanatory diagram of the manufacturing apparatus.
Figure 9:
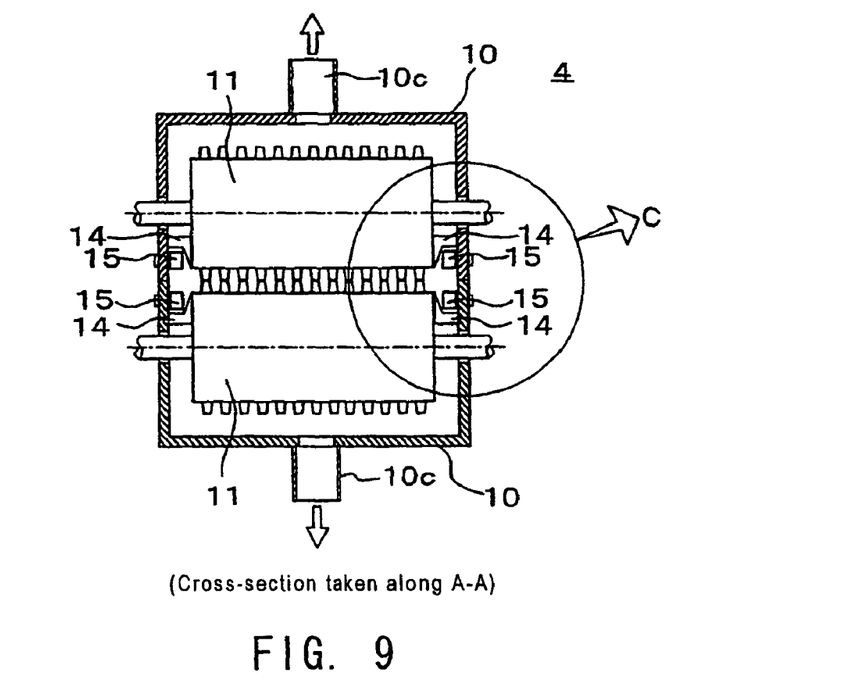
FIG. 9 is a cross-sectional explanatory diagram taken along line A-A of the drawings.
Figure 10:
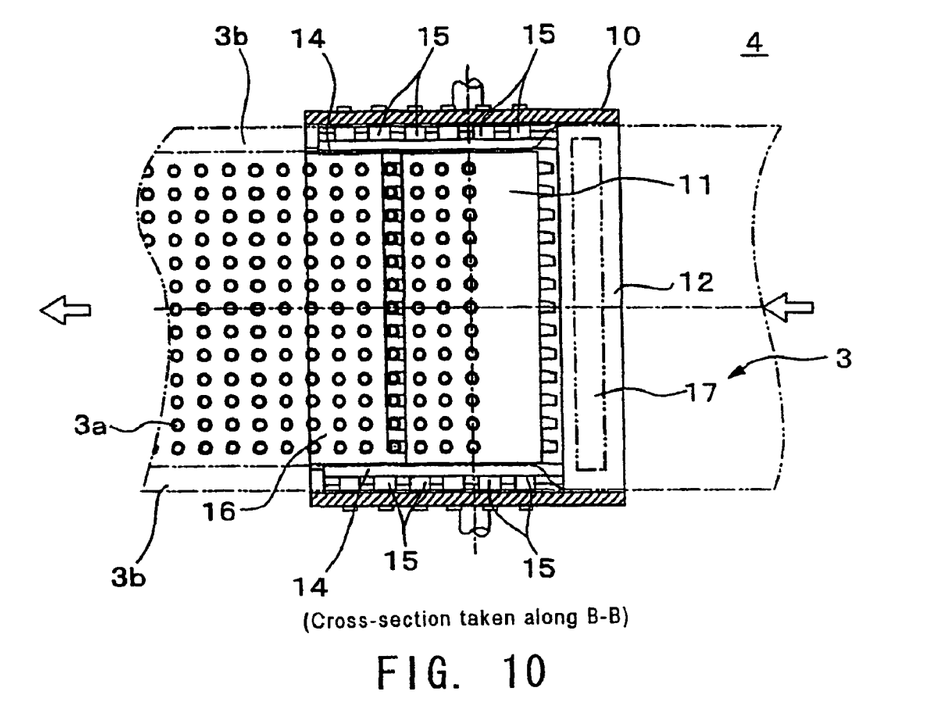
FIG. 10 is a cross-sectional explanatory diagram taken along line B-B of the drawings.

Among the above, the manufacturing apparatus 4 that is the main part of the present invention is provided with, as shown in FIGS. 8 to 10, a pair of pressure-reduced chambers 10 that are formed half-divided into the upper and the lower portions; emboss rollers 11 that are supported with bearings in the pressure-reduced chambers 10 and whose circumferential surfaces face the side of opening portions 10a that are opened in the juncture position of the pressure-reduced chambers 10; sheet-introduction plates 12 that are arranged in the upper and the lower inner sides of the opening portions 10a and are inclined toward the direction of the contact line, i.e., a contact point, on the circumferential surface of the emboss roller 11 (hereinafter, referred to as "contact point"); a plurality of border rollers 15 that are supported rotatably inside the opposite sides of the pressure-reduced chambers 10; a pair of border-roller-receiving and quasi-sealing members 14 that are opposed to the border rollers 15 with a small gap and are arranged on both the sides of each emboss roller 11 to quasi-seal both the sides of each emboss roller 15 in the pressure-reduced chambers 10; rear plates 16 that are arranged horizontally toward the contact point direction in the back of the emboss rollers 12 and are continuous toward the rear opening portion 10b of each pressure-reduced chamber 10; and a heater for heating 17 having a triangular cross section that is provided between the introduction plates 12.

Suction ports 10c for reducing pressure are opened on the upper and the lower portions of each of the pressure-reduced chambers 10. The pressure-reducing suction ports 10c are connected to a vacuum pump, which is not shown, via a hose, which is also not shown, and the pressure-reduced chambers 10 are evacuated to reduce the pressure, so that an atmospheric pressure is present between the two resin sheets 3 that are supplied toward the opening portion 10a, and the faces on the side of the emboss rollers 11 are in a reduced pressure, so that the difference in the pressure allows the two resin sheets 3 to be attracted to the surfaces of the two emboss rollers 11 and attached to the surfaces.

Figure 11:
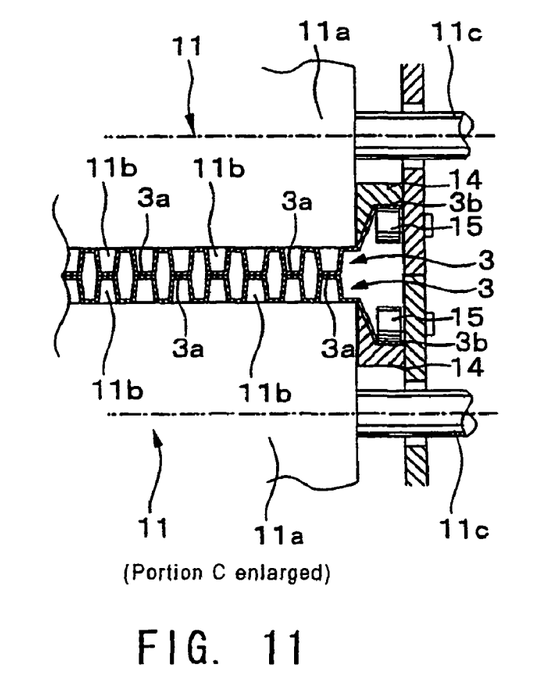
FIG. 11 is an enlarged view of a portion C of the drawings.
Figure 12:
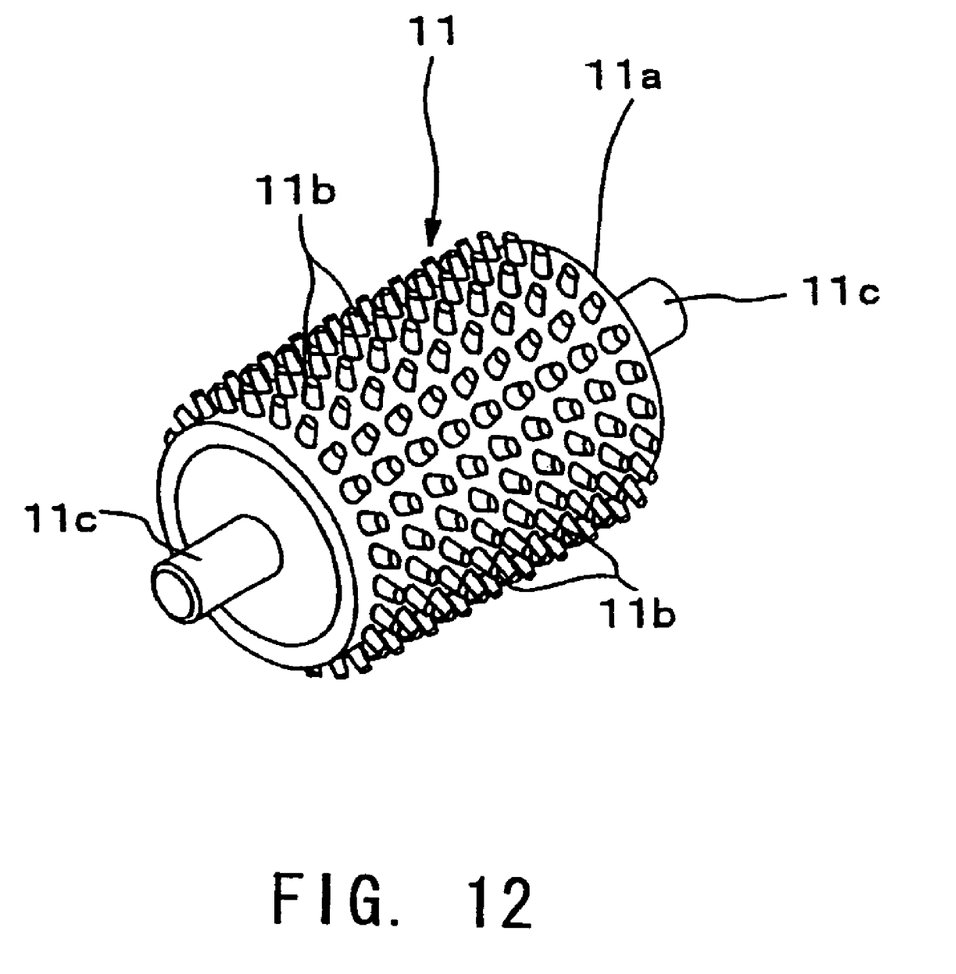
FIG. 12 is a perspective view of an emboss roller.

In the two emboss rollers 11, as shown in FIG. 11, a multitude of pins 11b are projected in a vertically and horizontally regular manner on the surface of the rollers 11a made of metal such as steel or aluminum die-cast. The shaft portions 11c of the rollers 11a are in the outer side faces of the two pressure-reduced chambers 10, and are operated in cooperation with a gear or a timing pulley so as to be rotated in the opposite directions from each other toward the conveying direction of the resin sheets 3. One of the shaft portions 11c is driven to be rotated by a motor, which is not shown. This motor drives each emboss roller 11 to rotate at a speed that is in synchronization with the take-up speed of the take-up device 7.

Furthermore, in the emboss rollers 11, holes (not shown) having a diameter, for example, of about 2 mm (preferably from 1 to 5 mm) are formed in the trough portion (flat portions other than the pins 11b) of the rollers 11a in order to prevent air accumulation from occurring between the resin sheets 3 and the emboss rollers 11. These holes are in communication with the inside of the pressure-reduced chambers 10. Thus, there is no difference in the degree of the reduced pressure between the inside of the pressure-reduced chambers 10 and the inside of the emboss rollers 11, so that the resin sheets 3 can be attracted to the emboss rollers 11 uniformly. Therefore, the emboss rollers 11 allow the internal portions to be hollow. The holes can be provided at such a ratio that one hole is formed for every 1.5 to 2 pins 11b; for example, holes can be provided in every trough portion formed with the pins 11b, or can be provided in such a ratio that one hole is formed for a plurality of trough portions.

Furthermore, the pins 11b are brought in contact in a line via the resin sheets 3 at the contact point of the upper and the lower emboss rollers 11, making thermal fusion possible by pressing to attach the resin sheets 3 with each other at this position.

The introduction plates 12 function to minimize the gap between the opening portion 10a and the resin sheets 6 that are introduced therefrom and to maintain a reduced pressure inside the pressure-reduced chambers 10.

The border-roller-receiving and quasi-sealing members 14 function to convey the resin sheets 3 to the rear by the rotation thereof while holding the laterally-opposite side portions of the resin sheets 3 in cooperation with the border rollers 15 and maintaining the state in which the resin sheets 3 are pressed onto the emboss rollers 11.

The heater 17 for heating serves to heat the opposing surfaces of the two resin sheets 3 to a temperature higher than the temperature at which they are melted and extruded to increase the temperature so as to ensure thermal fusion with the emboss rollers 11.

In the above, the resin sheets 3 in a semi-melted state that are extruded from the T-dies 2 are brought in contact with the upper and the lower emboss rollers 11 and are attracted and attached thereto while the pressure is evacuated and reduced from the upper and the lower surfaces in the manufacturing apparatus 4. As a result, a multitude of hollow protrusions 3a are formed in accordance with the shape of the pins 11b. Then, at the contact point of the emboss rollers 11, the respective pins 11a are brought in contact via the resin sheets 3, so that the end faces of the hollow protrusions 3a are thermally fused by thermo-compression by this contact. In other words, in this position, the contact surfaces of the two resin sheets 3 are cooled and solidified because the heat of the contact surfaces is deprived of by the emboss rollers 11. On the other hand, the surfaces opposite thereto are heated by the heater for heating 17 and are melted. Thus, thermal fusion can be performed easily.

After fusion, the sheets are easily released from the pins 11b for the same reason, and are let out from the rear opening portion 10b of the pressure-reduced chambers while being guided by the rear plates 16 and further cooled.

For the resin sheets 3 used for the above molding, polyolefin resin sheets, in particular, polypropylene sheets are preferable, but other thermoplastic resin materials in general can be used simply by changing the setting of a relevant part of the apparatus, depending on the various temperature characteristics such as the melting point, the softening point, the glass transition temperature or the properties of the material.

For example, when homopolypropylene (melting point: 165° C., softening point: 120° C.) is selected as an extrusion molding material, the surface temperature after extrusion is preferably a setting temperature of approximately from 150 to 200° C. in the vicinity of the front opening portion 10a. When the temperature is lower than this setting temperature, the material is difficult to deform so that molding under a reduced pressure cannot be performed. On the other hand, if the temperature is higher than the upper limit of the setting temperature, then the material is softened so that the shape-retaining properties of the resin sheets 3 deteriorate at the time of supply. Therefore, the temperature is set to be in the above-described range.

It is preferable that the heater temperature is from 280° C. to 320° C., and the heater 17 for heating is provided away from the two resin sheets 3 by 0.1 mm to 2 mm, preferably 0.3 to 1.2 mm, so that the resin sheets can be prevented from getting stuck to the rollers.

The degree of the reduced pressure in the pressure-reduced chambers 10 is from 300 to 2000 mm $H_2O$, preferably from 400 to 600 mm $H_2O$, to facilitate molding under a reduced pressure.

The gap between the plates 12, 16 and the emboss rollers 11 is preferably as small as possible in order to maintain the reduced pressure, and can be set to 1 mm or less, and preferably about 0.2 mm. However, this value is set for the purpose of preventing the contact of the plates 12, 16 to the emboss rollers 11 and ensuring the degree of the reduced pressure as much as possible, and therefore the gap can be made smaller, depending on the machine precision.

Each of the pins 11b of the emboss rollers 11 is truncated cone-shaped, as shown in the drawings. Practical sizes are preferably as follows: the difference in the size between the upper base and the lower base is 2 mm; the pin diameter is from 5 to 10 mm; the height is from 3 to 6 mm; and the pin pitch is from 10 to 15 mm. Thus, a hollow structure that is completed to be molded with these sizes has a thickness of from 6 to 12 mm, a weight of from 500 to 2,000 g/m$^2$, an in-plane compressive strength of from 0.5 to 1.5 MPa, a fracture load by bending of from 30 to 100 N, and a bending elasticity gradient of from 80 to 200 N/cm. Thus, a hollow structure having high strength for its thickness and its weight can be obtained. It should be noted that the in-plane compressive strength is measured according to JIS Z 0401, and the fracture load by bending is measured according to JIS K 7203. For the bending elasticity gradient, a load when a flexure of 1 cm occurred is obtained based on the straight portion of a load-flexure curve obtained by the above-described bending measurement, and this was taken as the bending elasticity gradient.

Next, as shown in FIG. 7, the laminating apparatus 5 includes calender rolls 20 for transferring an adhesive sequentially to the surface materials 6 that are let out from stock rolls 6a, and a pair of laminate rollers 21 arranged in the upper and the lower portions in the conveying path of the molded hollow structure. In place of using the laminating means employing an adhesive, thermal adhesion or other adhering means can be selected as appropriate.

Any materials can be used as the surface material 6, as long as it can be used for the purpose of closing the hollow protrusions 3a. For example, polypropylene sheets, which are the same material, can be used, or various sheet materials for decoration can be used when the hollow structure plate is used as, for example, an interior material for vehicles such as a ceiling material.

The above-described laminating apparatus 5 is not always necessary, and a hollow structure that is molded in the manufacturing apparatus 4 may be taken up as it is by the take-up device 7, and be made as an intermediate product.

Here, a hollow structure was molded by selecting homopolypropylene (melting point: 165° C., softening point: 120° C.) as an extrusion molding material, and setting the thickness of each resin sheet to 0.25 mm and the surface temperature after extrusion to about 180° C. in the vicinity of the front opening portion 10a of the pressure-reduced chambers 10. The temperature of the heater was heated to 300° C. and was placed 0.7 mm away from the two resin sheets 3 to prevent the resin sheets from getting stuck to the rollers. The degree of the reduced pressure of the pressure-reduced chamber 10 was 500 mm $H_2O$, and the take-up speed of the take-up device was 1.0 m/sec.

A hollow structure after completion of molding had a thickness of 11.0 mm, a weight of 1,000 g/m$^2$, an in-plane compressive strength of 1.0 MPa, a fracture load by bending MD of 52 N and TD of 47 N, and a bending elasticity gradient MD of 102 N/cm and TD of 92 N/cm. Thus, a hollow structure having high strength for its thickness and its weight was obtained.

On the other hand, when a hollow structure was molded using the same resin material and the same conditions but in a process in which heating with the heater 17 was omitted, the upper and the lower sheets were not attached or integrated, and therefore a desired hollow structure could not be obtained.

Thus, according to the present invention, hollow protrusion processing and melt joining of two thermoplastic resin sheets that have been extrusion-molded can be performed reliably in a short time. Furthermore, the resin of the top portion of each hollow protrusion produced by using the technique of the present invention can be easily made thicker than the leg portion, so that the top portions of the hollow protrusions can be attached and joined stably, compared with hollow protrusions whose top portions are made of thin resin.

Figure 13:
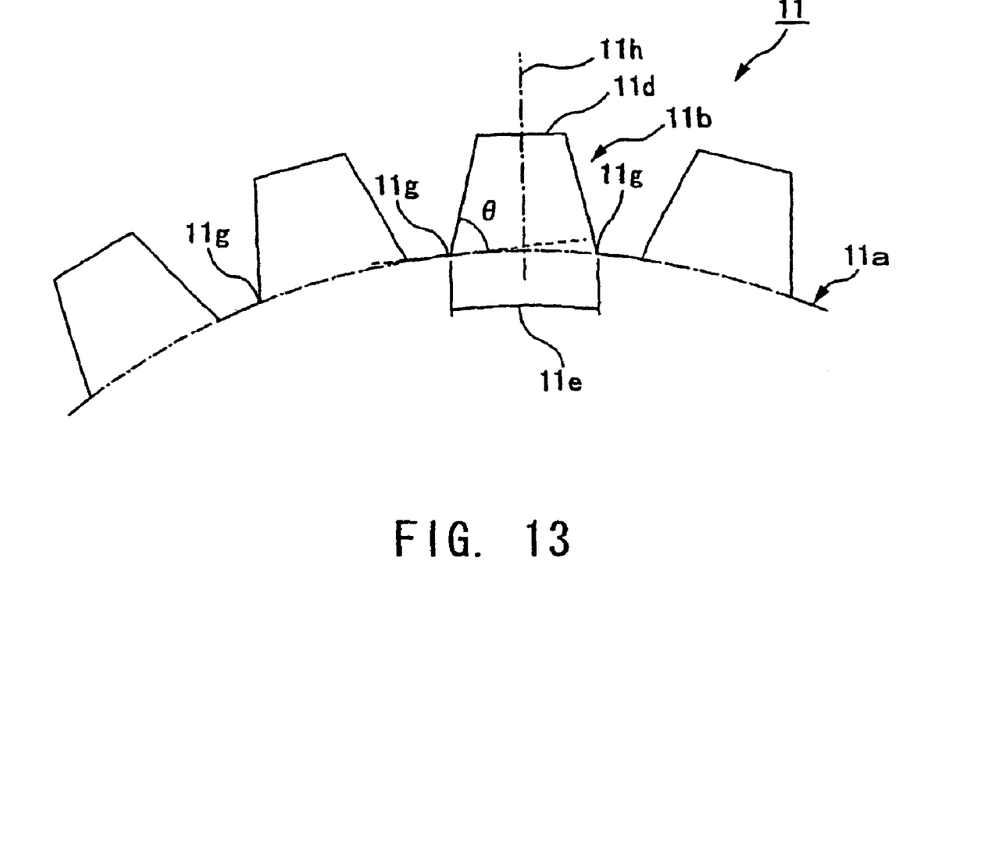
FIG. 13 is an enlarged explanatory diagram of a part of the emboss roller of FIG. 6.

In the above manufacturing apparatus, the pins 11b of the emboss rollers 11 are truncated cone-shaped (frustum of a cone), as shown in FIG. 13. The ratio of the total area of the lower bases 11e of the pins 11b, which are provided on the circumferential surface 11a of the emboss roller 11, to the area of the circumferential surface 11a of the emboss roller is in the range from 0.3 to 0.9. Moreover, the rising angle θ of the pin side face 11f in the vertical plane (sheet plane in FIG. 13) including the central axis 11h of the pin 11b (i.e., the angle formed with the contact point of the roller circumferential surface 11a at the rising portion 11g of the pin 11b) is in the range from 50 degrees to 70 degrees.

In other words, for example, when the height of the pin is 5 mm: the difference in the size between the upper base 11d and the lower base 11e is approximately from 3 to 5 mm; the ratio in diameter between the upper base and the lower base is in the range from 3:5 to 1:5, and in particular, in the range from 1:2 to 1:4; and the angle forming a protrusion 11j of the pin is an obtuse angle.

There is no limitation regarding the interval between the pins, but the smaller the interval is, the better the bending rigidity becomes. In the above-described range of the pin angle (from 50 to 70°), the interval between the pins is preferably set in the range from 0 to 4.0 mm, and more preferably, in the range from 1.5 to 2.5 mm, in view of the production cost (when the interval is small, a large number of pins is necessary), secondary processing (hole-opening processing when applied to a sound absorbing plate) or the like.

According to the above, the mold release property of the resin sheets 3 from the emboss rollers 11 is improved, and webbing does not occur even if the pin interval is reduced. In addition, the bending characteristics (in particular, bending elasticity gradient) of the produced hollow structure plate are improved.

Figure 14:
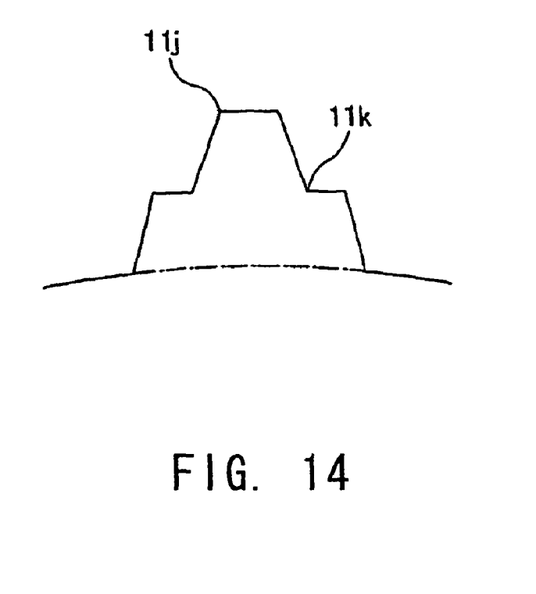
FIG. 14 is an enlarged cross-sectional view of a step provided in a pin of the emboss roller.

Furthermore, as shown in FIG. 14, the pin 11b can be shaped to have a step. In other words, the pin 11b is formed so as to have a recess 11k on the side face 11f thereof. In this case, it is preferable that both the protrusion 11j and the recess 11k, which are formed on the pin side face 11f, have obtuse angles. By doing this, the variation in the thickness between the produced hollow protrusions and the liner portions is reduced. Therefore, the bending elasticity gradient of the produced hollow structure plate is further improved.

It should be noted that it is also possible to provide a plurality of steps. Moreover, in the present invention, it is possible to configure the pin side face in the vertical plane including the central axis of the pin to be curved.

The invention claimed is:

1. A method for manufacturing a hollow structure plate comprising:

introducing two thermoplastic resin sheets into a pressure-reduced chamber;

attracting and attaching the resin sheets respectively to a circumferential surface of each of a pair of upper and lower emboss rollers that are arranged rotatably in said pressure-reduced chamber to form a multitude of hollow protrusions on each of the resin sheets in accordance with a shape of a pin projected in each of the emboss rollers; and thermally fusing the end faces of said hollow protrusions in a position of a contact line of the emboss rollers continuously;

wherein introduction guides are arranged respectively above and below a sheet-introducing opening portion of said pressure-reduced chamber, each of said introduction guides being inclined toward a direction of the contact line of each of the emboss rollers;

wherein heating means for thermal fusion is provided between the introduction guides, said heating means being arranged in a non-contact manner between said resin sheets; and wherein each of said resin sheets is attracted and attached respectively to the circumferential surface of each of the emboss rollers under a reduced pressure by maintaining opposing surfaces of said resin sheets in said pressure-reduced chamber at an atmospheric pressure and reducing a pressure at surfaces opposite therefrom.

2. A method for manufacturing a hollow structure plate according to claim 1, wherein means for inserting and guiding laterally-opposite side portions of each of said resin sheets along opposite side portions of said emboss rollers is provided.

3. A method for manufacturing a hollow structure plate according to claim 1, wherein a surface material is laminated on an upper and a lower surface of the hollow structure plate subsequently after the hollow structure plate is molded.

4. A method for manufacturing a hollow structure plate according to claim 2, wherein a surface material is laminated on an upper and a lower surface of the hollow structure plate subsequently after the hollow structure plate is molded.

* * * * *